US006182982B1

(12) United States Patent
Fleigle

(10) Patent No.: US 6,182,982 B1
(45) Date of Patent: Feb. 6, 2001

(54) WHEELCHAIR AND CASTER WHEEL MOUNTING FOR ADJUSTABLE HEIGHT WHEELCHAIR

(75) Inventor: Donald E. Fleigle, Ventura, CA (US)

(73) Assignee: Sunrise Medical HHG Inc., Longmont, CO (US)

( * ) Notice: Under 35 U.S.C. 154(b), the term of this patent shall be extended for 0 days.

(21) Appl. No.: 09/442,538

(22) Filed: Nov. 18, 1999

Related U.S. Application Data

(62) Division of application No. 09/088,277, filed on Jun. 1, 1998, and a continuation of application No. 09/088,270, filed on Jun. 1, 1998.

(51) Int. Cl.[7] .......... B62D 21/14
(52) U.S. Cl. .......... 280/43; 297/DIG. 4
(58) Field of Search .......... 280/250.1, 43, 280/43.13; 297/DIG. 4, 423.19, 344.12

(56) References Cited

U.S. PATENT DOCUMENTS

| | | | |
|---|---|---|---|
| 2,841,208 | 7/1958 | Duke | 155/171 |
| 2,868,275 | 1/1959 | Mize | 155/165 |
| 3,205,006 | 9/1965 | Mommsen | 297/423.37 |
| 3,301,595 | 1/1967 | Jennings | 297/423.37 |
| 3,376,067 | 4/1968 | Kernes | 297/423.37 |
| 3,453,027 | 7/1969 | Pivacek | 297/429 |
| 3,482,873 | 12/1969 | Pivacek | 297/429 |
| 3,672,722 | 6/1972 | Murcott | 297/437 |
| 3,761,126 * | 9/1973 | Mulholland . | |
| 3,854,774 | 12/1974 | Limpach | 297/429 |
| 3,857,606 | 12/1974 | Rodaway | 297/429 |
| 3,883,175 | 5/1975 | Rodaway | 297/416 |
| 4,026,164 | 5/1977 | Mozingo | 74/478 |
| 4,176,879 | 12/1979 | Rodaway | 297/423.37 |
| 4,428,615 * | 1/1984 | Hynson . | |
| 4,565,385 * | 1/1986 | Morford . | |
| 4,722,572 | 2/1988 | Sata | 297/423.37 |
| 4,813,693 | 3/1989 | Lockard et al. | 280/425 |
| 4,840,390 | 6/1989 | Lockard et al. | 280/250.1 |
| 4,931,809 | 6/1990 | Putman et al. | 343/882 |
| 4,981,305 | 1/1991 | Lockard et al. | 280/250.1 |
| 4,988,114 | 1/1991 | Thornton, Jr. et al. | 380/304.1 |
| 5,033,793 | 7/1991 | Quintile | 297/433 |
| 5,131,715 * | 7/1992 | Balles . | |
| 5,209,509 | 5/1993 | Gay et al. | 280/304.1 |
| 5,393,082 | 2/1995 | Fenley | 280/291 |
| 5,401,045 | 3/1995 | Foerster et al. | 280/250.1 |
| 5,772,236 * | 6/1998 | Clark . | |

FOREIGN PATENT DOCUMENTS

| | | |
|---|---|---|
| 2089204 | 2/1982 | (GB) . |

* cited by examiner

*Primary Examiner*—Milton Nelson, Jr.
(74) *Attorney, Agent, or Firm*—MacMillan, Sobanski & Todd, LLC

(57) ABSTRACT

An adjustable height wheelchair having two rear wheels which are secured to a wheelchair frame at either of two different heights. The wheelchair has left and right front frame sections, each of which has two pairs of spaced apertures. The apertures in each pair have the same predetermined spacing. Two front caster wheels are mounted on lower ends of two tube members, respectively. Each tube member has a pair of spaced apertures with the predetermined spacing. Fasteners secure the pair of apertures on each tube member to a selected pair of apertures on a front frame section based on the mounting position for the rear wheels. Optionally, a footrest or a legrest may be mounted on one or both of the front tube members.

5 Claims, 2 Drawing Sheets

WHEELCHAIR AND CASTER WHEEL MOUNTING FOR ADJUSTABLE HEIGHT WHEELCHAIR

CROSS-REFERENCE TO RELATED APPLICATIONS

This is a division of my copending U.S. patent application Ser. No. 09/088,277 filed Jun. 1, 1998 and a continuation of my copending U.S. patent application Ser. No. 09/088,270 filed Jun. 1, 1998, both still pending.

STATEMENT REGARDING FEDERALLY SPONSORED RESEARCH OR DEVELOPMENT

Not Applicable.

BACKGROUND OF THE INVENTION

This invention relates in general to wheelchairs, and in particular, to a mount for a caster wheel on an adjustable height wheelchair. A legrest or a footrest may be attached to the waster wheel mount.

Wheelchairs are frequently made so that the height of the seat above the ground may be adjusted to either of two heights: a higher standard height and a lower "hemi" height. The standard height is used when a wheelchair occupant desires to keep his or her feet off the ground. The feet may be supported by a footrest assembly. The hemi height is sometimes used by hemiplegics who have the use of one foot which can be used to assist propelling the wheelchair. In an adjustable height wheelchair, multiple mounting locations are provided for the larger rear wheel. Adjustment of the front caster wheels may be more difficult. In some wheelchairs, a telescoping tubes may be provided for mounting the front caster wheels. However, this arrangement provides some disadvantages when a footrest or a leg rest is provided. Wheelchair attachments such as a detachable footrest or an elevating legrest have been mounted directly on the wheelchair frame. The footrest or legrest will keep its position relative to the seat surface with a telescoping caster wheel mount. However, these attachments have needed adjustment when the height of the wheelchair is changed, for example, raising so as to not interfere with the ground when the wheelchair is lowered to a hemi position.

BRIEF SUMMARY OF THE INVENTION

The invention relates to a mount for caster wheels on an adjustable height wheelchair and to a footrest assembly and a legrest assembly that are mounted on the caster wheel mount. Front tubular members are adapted to attach to the front of each side of the wheelchair frame. A caster wheel is secured to a lower end of the front tubular member. Each front tubular member is provided with at least one pair of vertically spaced mounting holes or apertures which may be selectively secured to any of at least two pairs of vertically spaced mounting holes or apertures on the front of each side of the wheelchair frame. Different pairs of mounting holes are provided on the wheelchair frame for use when the larger rear wheels are mounted in the standard position and in the hemi position. Optional attachments such as an optional footrest assembly or an optional legrest assembly may be secured to the front tubular member rather than to the wheelchair frame. Thus, the spacing of the optional attachments relative to the ground remains the same when the wheelchair height is changed.

Accordingly, it is an object of the invention to provide a caster wheel mounting for an adjustable height wheelchair and a wheelchair incorporating such mounting.

Other objects and advantages of the invention will become apparent from the following detailed description of the invention and the accompanying drawings.

DETAILED DESCRIPTION OF THE INVENTION

Figure 1:
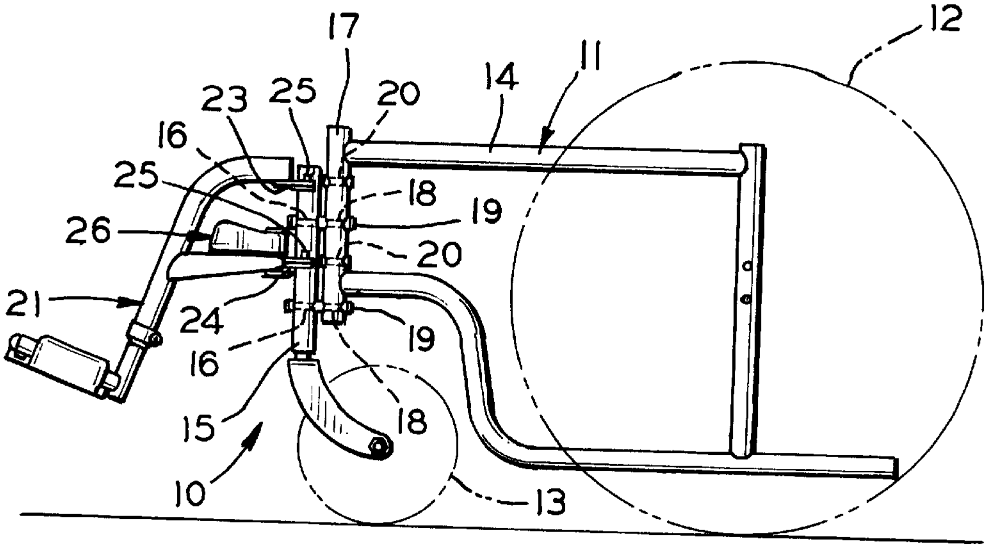
FIG. 1 is a side elevational view of a portion of a wheelchair shown in partial phantom including a caster wheel mount according to the invention and a footrest assembly attached to the caster wheel mount.

Referring now to the drawings, FIG. 1 shows a caster wheel mount 10 for use with an adjustable height wheelchair 11. Typically, each side of a wheelchair 11 includes a large rear wheel 12 (shown in phantom), a small front guide or caster wheel 13 (shown in phantom), and a frame 14. The large rear wheels 12 are rotatably attached to the frame 14 in a manner well-known in the art. It should be noted that FIG. 1 illustrates only a portion the left side of an exemplary wheelchair 11 with respect to an occupant sitting in the wheelchair 11, and that the right side of the wheelchair 11 would be a mirror image with respect to the left side of the wheelchair. Frequently, multiple mounting positions are provided for the wheels 12 and 13 for adjusting the height of the wheelchair. Typically, the wheelchair height may be adjusted between a standard height wherein the feet of a person sitting in the wheelchair 11 are substantially clear of the ground and a lower "hemi" height wherein a hemiplegic may use one foot to help propel the wheelchair.

According to the invention, the caster wheel 13 is mounted on a front tube member 15. The front tube member 15 is provided with a pair of vertically spaced mounting apertures 16. The wheelchair frame 14 has a vertical front frame section 17 having a pair of similarly spaced apertures 18. The front tube member 15 is secured to the frame section 17 by aligning the pairs of apertures 16 and 18 and securing with threaded fasteners 19, such as bolts passed through the aligned apertures 16 and 18. The front tube member 15 is shown attached to the frame section 17 such that the height of the wheelchair is in a "standard" height. In addition, the frame section 17 includes a second pair of similarly spaced apertures 20. When the front tube member 15 is attached to the frame section 17 using the second set of apertures 20, the front of the wheelchair is in a "hemi" height. At the same time, the mounting of the large rear wheel 12 on the frame member 16 is adjusted to the hemi height setting. The "hemi" height lowers the relative position of the frame 14 with respect to the ground, along with the height of an occupant sitting the in wheelchair, such that the occupant may be able to propel the wheelchair with a capable foot, if desired. The standard height and hemi height mountings for the rear wheel 12 are well known in the wheelchair art, as are other methods for adjusting the height of the front of the wheelchair.

Figure 2:
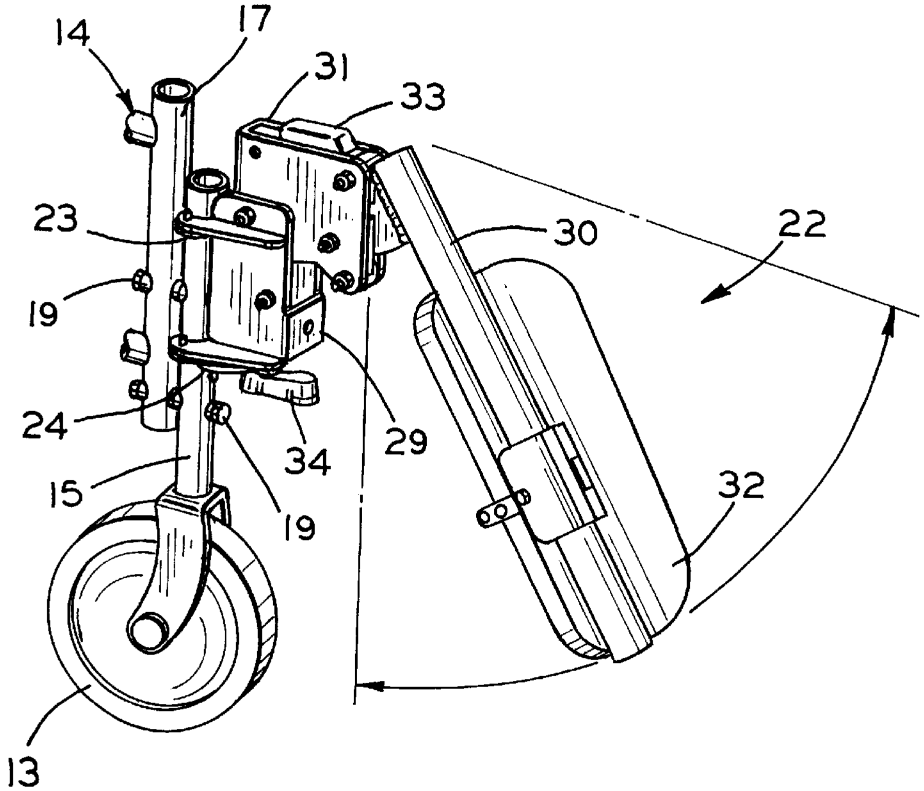
FIG. 2 is a fragmentary perspective view showing a caster wheel mount according to the invention and an elevating legrest assembly attached to the caster wheel mount.
Figure 3:
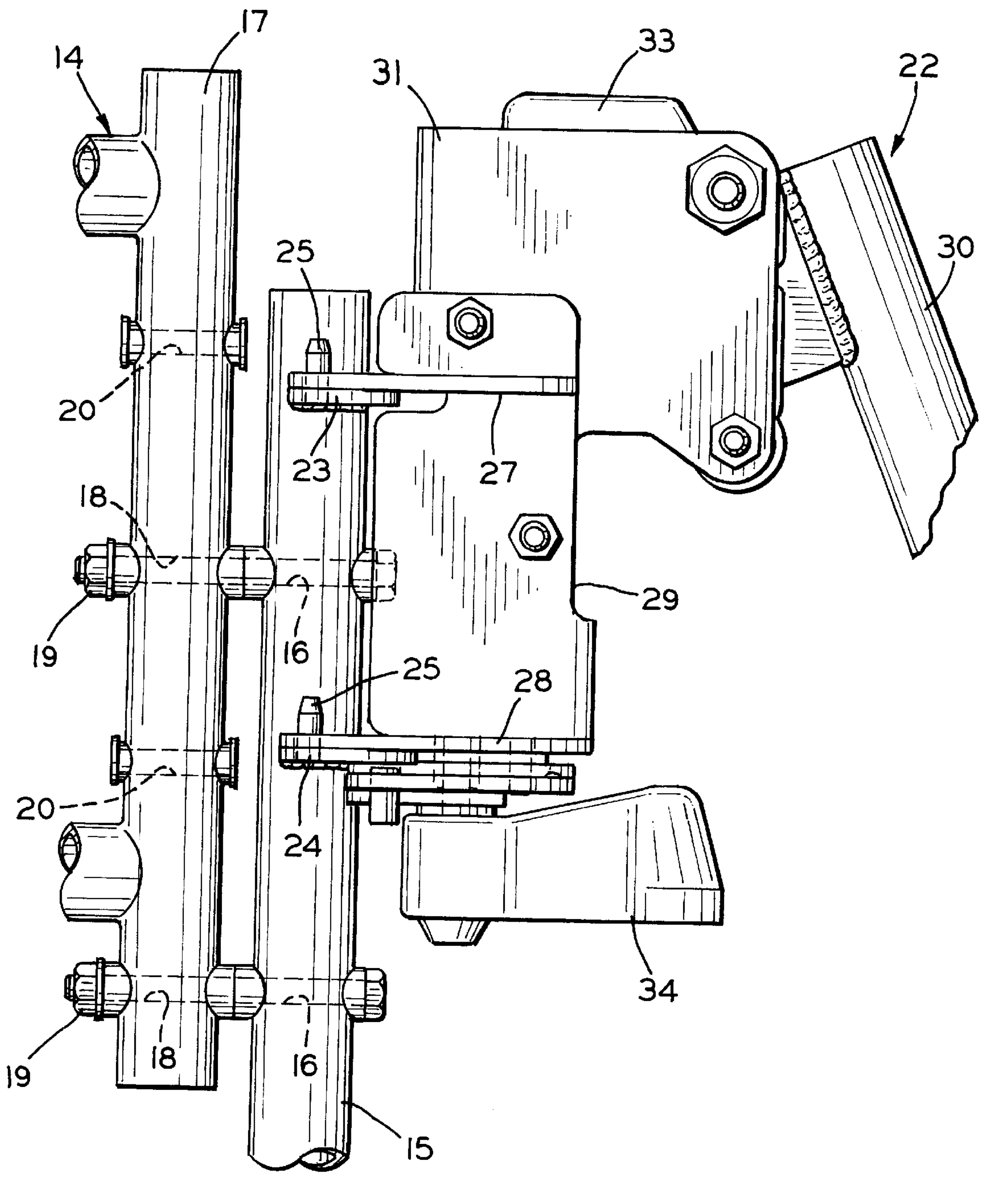
FIG. 3 is an enlarged fragmentary side elevational view showing details of the caster wheel mount of FIG. 2.

Optionally, either a footrest assembly 21 as shown in FIG. 1 or an elevated legrest assembly 22 as shown in FIGS. 2 and 3 may be attached to the front tube member 15. By mounting the footrest assembly 21 or the legrest assembly 22 on the front tube member 15 rather than on the frame 14, the footrest assembly 21 or the legrest assembly 22 will maintain its spacing from the ground when the height of the wheelchair is changed.

The footrest assembly 21 shown in FIG. 1 is releasably mounted on upper and lower vertically spaced plates 23 and 24 which are welded to the front tube member 15. Each of the plates 23 and 24 includes a pivot pin 25 which is pivotally engaged by the footrest assembly 21. A manually releasable latch mechanism 26 releasably secures the footrest assembly 21 to the plates 23 and 24 to hold the footrest assembly 21 in position when being used by a person in the wheelchair 11. When the latch mechanism 26 is pressed to release the footrest assembly 21, the footrest assembly 21 may be pivoted towards a side of the wheelchair to facilitate getting into and out of the wheelchair. Also, when the latch mechanism 26 is released, the footrest assembly 21 may be lifted from the wheelchair 11.

FIGS. 2 and 3 show the elevated legrest assembly 22 releasably attached to the front tube member 15. The upper and lower plates 23 and 24 are welded to the front tube member 15 and the pivot pins 25 are secured to the plates 23 and 24 to extend upwardly and to be in axial alignment. Upper and lower mounting plates 27 and 28 are attached to a lower bracket 29 with the same spacing as the plates 23 and 24. Holes (not shown) are formed in the mounting plates 27 and 28 for receiving the pivot pins 25 when the lower bracket 29 is positioned on the front tube member 15. A legrest support tube 30 is pivotally mounted on an upper bracket 31 which is attached to the lower bracket 29. A calf support 32 is mounted on the legrest support tube 30. Upon pressing a latch release knob 33 on the upper bracket 31, the legrest support tube 30 and attached calf support 32 may be pivoted about a horizontal axis to raise and lower the calf support 32. The lower bracket 29 can pivot about a vertical axis on the pivot pins 25 between a position with a calf support 32 in a first position for use by an occupant of the wheelchair and a second position wherein the legrest assembly 22 is to the side of the wheelchair to facilitate sitting down and rising from the wheelchair. A release knob 34 on the lower bracket 29 operates a latch which locks the legrest assembly 22 in the first position or releases the legrest assembly 22 to pivot to the second position.

Details of the footrest assembly 21 are shown in my copending U.S. patent application Ser. No. 09/088,277 filed Jun. 1, 1998, and details of the legrest assembly 22 are shown in my copending U.S. patent application Ser. No. 09/088,270 filed Jun. 1, 1998, the disclosures of which are incorporated herein.

It will be appreciated that various modifications and changes may be made to the above described embodiment of a caster wheel mounting for an adjustable height wheelchair without departing from the scope of the following claims. Although the two pairs of apertures 18 and 20 on the frame section 17 are shown as each having separate upper and lower apertures, it will be appreciated that the upper aperture of the pair 18 and the lower aperture of the pair 20 may be the same hole. Although the front tube member 15 has been illustrated as having either a footrest assembly 21 or an elevating legrest assembly 22 attached, it will be appreciated that neither of these need be attached to the front tube member 15, or that other accessories may be attached to the front tube member 15.

What is claimed is:

1. A wheelchair, comprising: a frame including two front frame sections each having first and second pairs of spaced apertures, said apertures in each pair having a predetermined spacing, two rear wheels adapted to be mounted on said frame at either of first and second heights, two front caster wheels, and mounts for attaching one of said caster wheels to each of said front frame sections, said mounts for each caster wheel including a front tube member having a lower end mounting one of said caster wheels, said front tube members each having a pair of spaced apertures having said predetermined spacing whereby said pair of spaced apertures on a front tube member may be aligned with either of said first and second pairs of spaced apertures on a front frame section, and fasteners passing through aligned apertures on said front tube member and on said frame sections, said fasteners securing said front tube members to said front frame sections.

2. The wheelchair according to claim 1, and wherein for each front frame section one aperture is common to each of said first and second pairs of apertures on such front frame section.

3. The wheelchair according to claim 1, and further including a footrest assembly mounted on at least one front tube member.

4. The wheelchair according to claim 1, and further including a legrest assembly mounted on at least one front tube member.

5. A wheelchair, comprising: a frame including two front frame sections each having at least one pair of spaced apertures, said apertures having a predetermined spacing, two rear wheels mounted on said frame, two front caster wheels, and mounts for attaching one of said caster wheels to each of said front frame sections, each of said mounts including a front tube member having a lower end mounting one of said caster wheels, said front tube members each having a pair of spaced apertures having said predetermined spacing whereby said pair of spaced apertures on a front tube member may be aligned with pair of spaced apertures on a front frame section, and fasteners passing through aligned apertures on said front tube member and on said frame sections, said fasteners securing said front tube member to said front frame section.

* * * * *